K. J. JOHNSON.
COMBINED OPERATING MECHANISM FOR FOOT ACTUATORS AND CUT-OUT VALVES.
APPLICATION FILED FEB. 17, 1919.
1,364,113.
Patented Jan. 4, 1921.
2 SHEETS—SHEET 1.
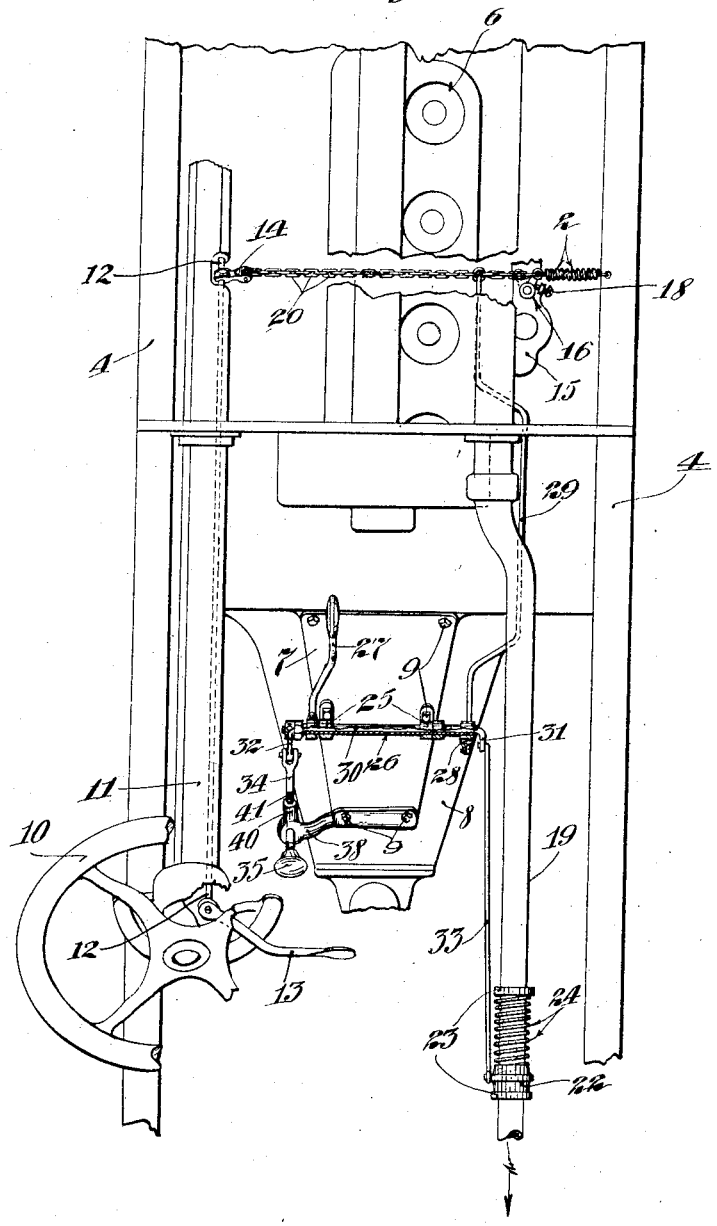

K. J. JOHNSON.
COMBINED OPERATING MECHANISM FOR FOOT ACTUATORS AND CUT-OUT VALVES.
APPLICATION FILED FEB. 17, 1919.
1,364,113.
Patented Jan. 4, 1921.
2 SHEETS—SHEET 2.
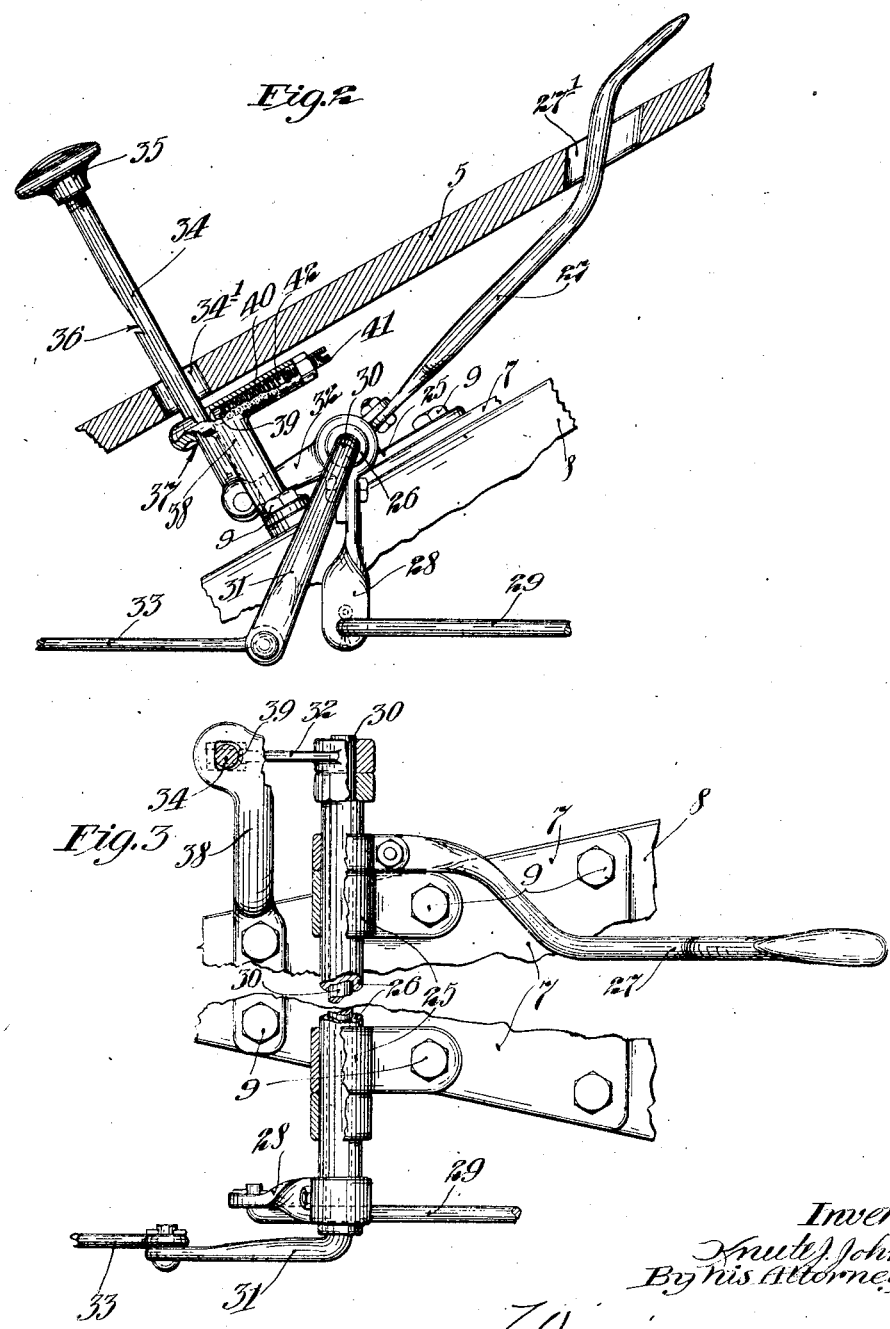

UNITED STATES PATENT OFFICE.

KNUTE J. JOHNSON, OF MINNEAPOLIS, MINNESOTA.

COMBINED OPERATING MECHANISM FOR FOOT-ACTUATORS AND CUT-OUT VALVES.

1,364,113.

Specification of Letters Patent.  Patented Jan. 4, 1921.

Application filed February 17, 1919. Serial No. 277,556.

*To all whom it may concern:*

Be it known that I, KNUTE J. JOHNSON, a citizen of the United States, residing at Minneapolis, in the county of Hennepin and State of Minnesota, have invented certain new and useful Improvements in Combined Operating Mechanism for Foot-Actuators and Cut-Out Valves; and I do hereby declare the following to be a full, clear, and exact description of the invention, such as will enable others skilled in the art to which it appertains to make and use the same.

My present invention relates to an attachment for an automobile having for its motive power an internal combustion engine, and has for its object to provide combined operating mechanism for a foot accelerator and cut-out valve for the engine thereof.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary plan view of an automobile having the invention applied thereto;

Fig. 2 is a fragmentary detail view partly in plan and partly in section, on an enlarged scale; and Fig. 3 is a plan view of certain of the parts shown in Fig. 2.

The invention, as illustrated in the drawings, is applied to an automobile of the Ford type, and, of the standard parts thereof, it is important to note the frame 4, footboard 5, internal combustion engine 6, transmission cover 7 detachably secured to the transmission case 8 by screws 9, steering wheel 10, steering post 11, throttle rod 12 having on its upper end a throttle lever 13 and on its lower end an arm 14, carbureter 15 having a throttle valve 16, of the butterfly type, and provided with an arm 17 arranged to engage an adjustable stop 18 when said valve is closed, and an exhaust pipe 19.

In the standard equipment of a Ford automobile, the arms 14 and 17 are connected by a stiff rod which positively opens and closes the throttle valve 16, under the operation of the throttle lever 13. In applying my invention, I remove this rod and substitute therefor a flexible connection 20, as shown in the form of a chain. This chain or flexible connection 20 affords positive means for opening the throttle valve 16 and to close the same, I anchor a coiled spring 21 to the frame 4 and attach the same to the arm 17 which yieldingly holds said arm against the stop 18 and the throttle valve in a closed position.

In the exhaust pipe 19, is formed a port normally closed by a sleeve-like cut-out valve 22 located between the exhaust manifold and muffler and disclosed and claimed in my co-pending application executed of even date herewith. This cut-out valve 22 is mounted for axial sliding movement on the exhaust pipe 9 and located between a pair of longitudinally spaced collars 23 rigidly secured to said exhaust pipe. A coiled spring 24, encircling the exhaust pipe 19, is compressed between one of the collars 23 and the adjacent end of the cut-out valve 22 and yieldingly holds said valve against the other of said collars as a stop and in a position to close the port.

A pair of axially spaced bearings 25 are detachably secured to the transmission cover 7 by means of the two intermediate bolts 9. Journaled in these bearings 25, is a tubular shaft 26 having secured to one of its ends an upwardly and forwardly projecting accelerator foot pedal 27 and to its other end a downwardly projecting crank arm 28. It may be here stated that the foot pedal 27 works through a slot 27' in the foot board 5 and is located next to the brake pedal, not shown, thus making it very easy for the operator to shift his foot from the accelerator pedal to the brake pedal.

One end of an operating rod 29 is pivotally secured to the crank arm 28 and the other end thereof is attached to the intermediate portion of the flexible connection 20. It will be noted that the intermediate portion of the rod 29 is bent laterally outward to clear the fly-wheel of the engine 6. From the above description of the accelerator, it is evident that the operator may open the throttle valve 16 by the use of either the throttle lever 13 or foot pedal 27. When operated by the throttle lever 13, the forward end of the rod 29 will simply move laterally under the endwise movement of the connection 20, when the throttle valve 16 is opened and closed.

When the throttle valve 16 is opened by the foot pedal 27, a downward pressure on said pedal will rock the tubular shaft 26, and thereby through its crank arm 28 to impart an endwise movement to the rod 29, and thus draw the attached intermediate portion of the flexible connection 20 out of alinement with the ends thereof. At this time, the arm 14 becomes a fixed base of anchorage for said connection and the bending thereof will swing the throttle arm 17 against the tension of the spring 21 and open the throttle valve 16. As soon as the pressure on the foot pedal 27 is released, the spring 21 will immediately close the throttle valve 16.

Journaled in the tubular shaft 26, is a shaft 30, one end of which is bent laterally downward to form a crank arm 31, and secured to the other end thereof, is a crank arm 32 which projects downwardly and rearwardly. A rod 33 connects the crank arm 31 to the cut-out valve 22. Pivoted to the crank arm 32, is the depending stem 34 of a foot pedal 35 which works through a slot 34' in the foot board 5. By a downward pressure on the foot pedal 35, the shaft 30 is rocked in the tubular shaft 26, and thereby imparts a forward endwise movement to the rod 33 to open the cut-out valve 22 against the tension of the spring 24. As soon as the pressure on the pedal 35 is released, the spring 24 immediately closes the valve 22 and returns the operative connections therefor to normal positions.

To lock the foot pedal 35 down and thereby hold the cut-out valve 22 open, there is formed in the stem 34 a lock shoulder 36 arranged to engage, by a lateral movement of said stem, a detent 37 on a bracket 38 detachably secured to the transmission cover 7 by the two rearmost screws 9. To cause the lock shoulder 36 to automatically engage the detent 37 under a downward movement of the foot pedal 35, to open the cut-out valve 22, there is provided a spring-pressed bolt 39 arranged to engage the opposite side of the stem 34 from said lock shoulder. This bolt 39 is mounted in a casing 40 formed in the bracket 38 and is held against the stem 34 under a variable pressure by a set screw 41, which impinges against a follower 42 in said casing. The spring of the bolt 39 is compressed between a shoulder on said bolt and a shoulder on the follower 42. The set screw 41 has screw-threaded engagement with the casing 40.

To release the lock shoulder 36 from the detent 37, a slight forward pressure on the pedal 35 is only necessary to overcome the action of the spring-pressed bolt 39. With the lock shoulder 36 released from the detent 37, the spring 24 closes the valve 22 and returns the operating parts thereof, together with the foot pedal 35, to normal positions.

From the above description, it is evident that the invention may be attached to an automobile with very little work and without mutilating any of the parts, with the exception of the two slots cutting the foot board for operating the pedals thereof.

What I claim is:—

1. In an automobile, the combination with an internal combustion engine, of a flexible connection between the arms on the throttle rod and throttle valve, a tubular shaft journaled in bearings secured to the automobile, a second shaft journaled in said tubular shaft, a normally closed cut-out valve in the exhaust pipe, each of said two shafts having a foot pedal and a crank arm, and two operating rods, the one connecting one of said crank arms to the cut-out valve and the other connecting the other of said crank arms to the intermediate portion of said flexible connection.

2. In an automobile, the combination with an internal combustion engine, of a flexible connection between the arms on the throttle rod and throttle valve, a tubular shaft journaled in bearings secured to the automobile, a second shaft journaled in said tubular shaft, a normally closed cut-out valve in the exhaust pipe, each of said two shafts having a foot pedal and a crank arm, two operating rods, the one connecting one of said crank arms to the cut-out valve and the other connecting the other of said crank arms to the intermediate portion of said flexible connection, and a latch operative on the foot pedal for the cut-out valve to hold said valve in an operative position.

3. In an automobile, the combination with an internal combustion engine, of a flexible connection between the arms on the throttle rod and throttle valve, bearings on the transmission cover, a shaft journaled in said bearings and provided with a foot pedal and crank arm, said foot pedal loosely extending through the foot board, and an operating rod connecting said crank arm to the intermediate portion of said flexible connection.

4. In an automobile, the combination with an internal combustion engine, of a flexible connection between the arms on the throttle rod and throttle valve, bearings secured to the transmission cover by certain of the securing screws thereof, a tubular shaft journaled in said bearings, a second shaft journaled in said tubular shaft, a normally closed cut-out valve in the exhaust pipe, each of said two shafts having a foot pedal and a crank arm, and two operating rods, the one connecting one of said crank arms to the cut-out valve and the other thereof connecting the other of said crank arms to the intermediate portion of said flexible connection.

5. In an automobile, the combination with an internal combustion engine; of a flexible connection between the arms on the throttle valve, bearings secured to the transmission cover by certain of the securing screws thereof, a tubular shaft journaled in said bearings, a second shaft journaled in said tubular shaft, a normally closed cut-out valve in the exhaust pipe, each of said two shafts having a foot pedal and a crank arm, two operating rods, the one connecting one of said crank arms to the cut-out valve and the other thereof connecting the other of said crank arms to the intermediate portion of said flexible connection, a bracket detachably secured to the transmission cover by certain of the securing screws thereof, and latching means mounted on the bracket for holding the pedal for the cut-out valve in a position to keep said valve open.

In testimony whereof I affix my signature in presence of two witnesses.

KNUTE J. JOHNSON.

Witnesses:
 CLARE DEMAREST,
 HARRY D. KILGORE.